(12) United States Patent
Alegria et al.

(10) Patent No.: US 8,183,422 B2
(45) Date of Patent: May 22, 2012

(54) HYDROCARBONS FROM PYROLYSIS OIL

(75) Inventors: Edgar Lotero Alegria, Cleveland, OK (US); Kristi Fjare, Bartlesville, OK (US); Daren Daugaard, Skiatook, OK (US); Alexandru Platon, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/274,754

(22) Filed: Oct. 17, 2011

(65) Prior Publication Data

US 2012/0035404 A1  Feb. 9, 2012

Related U.S. Application Data

(60) Provisional application No. 61/406,210, filed on Oct. 25, 2010.

(51) Int. Cl.
*C07C 4/00* (2006.01)
*C10L 1/14* (2006.01)

(52) U.S. Cl. ............ 585/240; 585/242; 585/14; 44/589; 44/590; 44/599

(58) Field of Classification Search .................. 585/240, 585/242, 14; 44/589, 590, 599
See application file for complete search history.

(56) References Cited

U.S. PATENT DOCUMENTS

| 3,793,190 | A * | 2/1974 | Nastast et al. | 208/57 |
| 7,998,315 | B2 * | 8/2011 | Bridgwater et al. | 201/2.5 |
| 2008/0178521 | A1 * | 7/2008 | Nemoto et al. | 44/307 |
| 2011/0245554 | A1 * | 10/2011 | Huber et al. | 585/251 |

OTHER PUBLICATIONS

Oasmaa et al. "Quality Improvement of Pyrolysis Liquid: Effect of Light Volatiles on the Stability of Pyrolysis Liquids", Energy & Fuels 2005 19, 2556-2561.*

* cited by examiner

*Primary Examiner* — Nina Bhat
(74) *Attorney, Agent, or Firm* — ConocoPhillips Company

(57) ABSTRACT

Described is a process for converting pyrolysis oil obtained by pyrolysis of biomass into fuel range hydrocarbon by alcoholysis of pyrolysis oil with subsequent hydrotreatment. A straightforward methodology to prepare upgradeable pyrolysis oil via alcoholysis. A method hydrotreating technology for oxygen removal and hydrocarbon production. The resulting hydrocarbon products are 100% fungible with conventional transportation fuels.

20 Claims, 1 Drawing Sheet

Schematic representation of the steps involved in pyrolysis oil alcoholysis with subsequent hydrotreating to hydrocarbons.

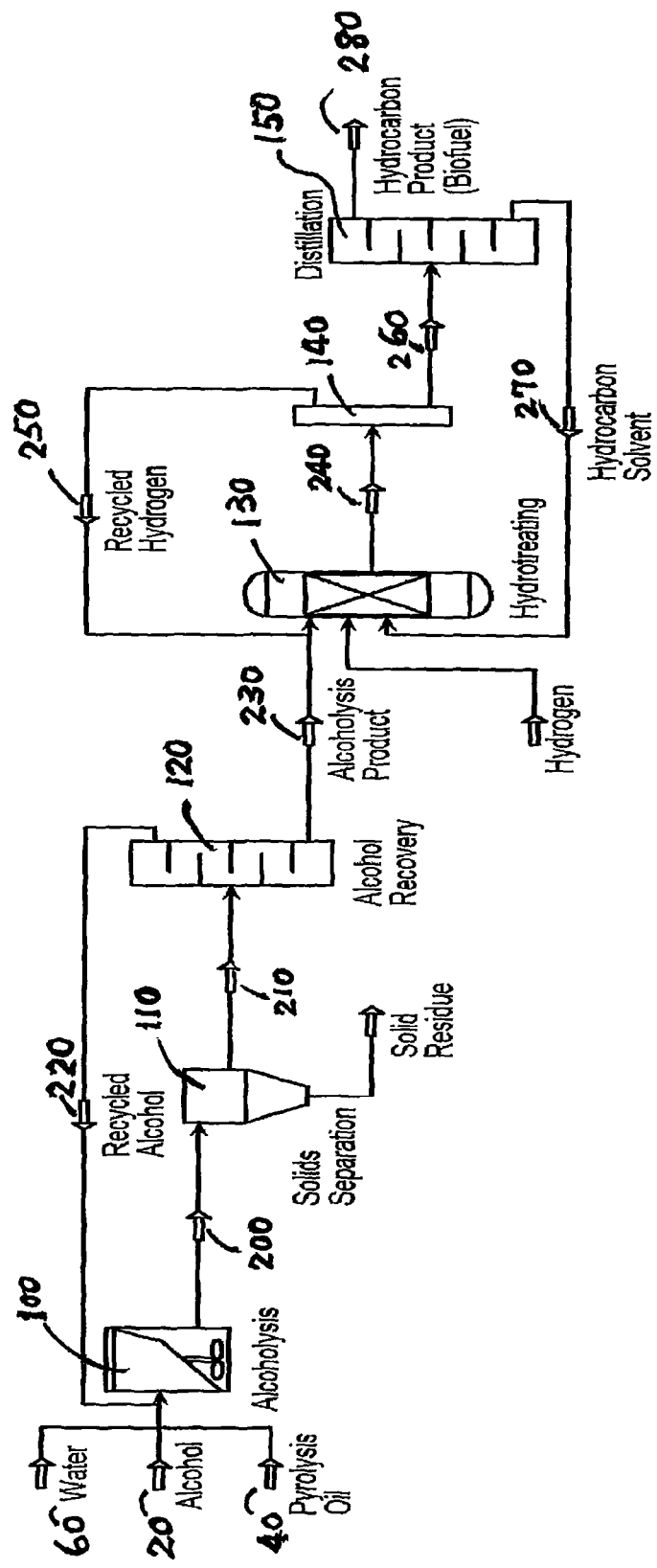
Schematic representation of the steps involved in pyrolysis oil alcoholysis with subsequent hydrotreating to hydrocarbons.

HYDROCARBONS FROM PYROLYSIS OIL

CROSS-REFERENCE TO RELATED APPLICATIONS

This application is a non-provisional application which claims benefit under 35 USC §119(e) to U.S. Provisional Application Ser. No. 61/406,210 filed Oct. 25, 2010, entitled "HYDROCARBONS FROM PYROLYSIS OIL," which is incorporated herein in its entirety.

STATEMENT REGARDING FEDERALLY SPONSORED RESEARCH OR DEVELOPMENT

None.

FIELD OF THE INVENTION

The present invention relates generally to the conversion of biomass to fuel range hydrocarbons.

BACKGROUND OF THE INVENTION

Due to governmental legislation as mandated in the Renewable Fuels Standards (RFS), there is an increasing need for biofuels fungible at high concentrations with current transportation fuels. The bio-oils obtained by pyrolysis of biomass or waste have received attention recently as an alternative source of fuel.

Pyrolysis is the chemical decomposition of organic materials by heating in the absence of oxygen or other reagents. Pyrolysis can be used to convert biomass (such as lignocellulosic biomass) into pyrolysis oil or so-called bio-oil.

The major advantage of these fuels is that these are $CO_2$ neutral and contain a very low fraction of bonded sulfur and nitrogen. Thus, they contribute very little to the emission of greenhouse gases or other regulated air pollutants.

There has been a considerable effort in the past to develop pyrolysis processes for the conversion of biomass and waste to liquids for the express purpose of producing renewable liquid fuels suitable for use in boilers, gas turbines and diesel engines.

However, pyrolysis oil (or bio-oil) produced from pyrolysis of biomass is a chemically-complex mixture of compounds comprising generally a mixture of water, light volatiles, and non-volatiles. As a fuel, pyrolysis oil has a number of negative properties such as high acidity (lead to corrosion problem), substantial water content (usually in the range of 15% to 30%), variable viscosity, low heating values (about half that of the diesel fuel), low cetane number, etc. These negative properties are related to the oxygenated compounds contained in bio-oils that result in an oxygen content of approximately 45 wt %. Therefore, it is necessary to upgrade the raw bio-oils before they can be used as a viable and regular fuel.

The upgrading of pyrolysis oils, a necessary process before use as a regular fuel, essentially involves the removal of oxygen. Particular attention has been focused on hydrotreating using conventional petroleum refining catalysts, for example, cobalt-molybdenum or nickel-molybdenum on alumina to produce essentially oxygen-free naphthas. Since pyrolysis liquids typically contain oxygen at 30 to 50 wt %, complete removal of oxygen requires a substantial consumption of hydrogen, estimated to be as much as 600 to 1000 L/kg of pyrolysis liquid [W. Baldauf, et al., 7th European Conference on Biomass for Energy and Environment, Agriculture and Industry]. This method represents a major and prohibitive cost.

Currently, there is no commercial technology that allows obtaining fungible biofuels from pyrolysis oil in large volumes to compete with current established biofuels.

Therefore, developing a new method or process for upgrading the bio-oils obtained by pyrolysis of biomass or waste to thermally stable and fungible renewable fuels would be a significant contribution to the art.

BRIEF SUMMARY OF THE DISCLOSURE

The present invention relates to a process for converting pyrolysis oil obtained by pyrolysis of biomass into fuel range hydrocarbon by alcoholysis of pyrolysis oil with subsequent hydrotreatment. In certain embodiments disclosed herein, there is provided a process for converting pyrolysis oil to a fuels-range hydrocarbon, comprising, a) reacting a pyrolysis oil with a feed comprising one or more alcohol species in a reactor to form a product mixture comprising an alcoholysis product, and b) contacting the alcoholysis product with a hydrotreating catalyst in the presence of hydrogen in a reaction zone under reaction conditions sufficient to convert at least a portion of said alcoholysis product into one or more fuel range hydrocarbon products.

The product mixture of step (a) may additionally comprise solid residue and an un-reacted quantity of the one or more alcohol species. The process may also optionally further comprise a step for pyrolyzing a biomass to form the pyrolysis oil used in the process.

In general, the reacting of pyrolysis oil and feed is performed at a temperature between about 150° C. and about 500° C.; a pressure between about 500 psig and about 4000 psig, and for a duration of between 2 min and 240 minutes. Optionally, the reacting of pyrolysis oil and feed may be performed at a temperature between about 250° C. and about 500° C., a pressure of between about 1500 psig and about 4000 psig, and for a duration of between 15 min and 120 min.

In general, the contacting in the presence of a hydrotreating catalyst is performed at a temperature of between about 120° C. and 450° C. and a pressure between about 500 psig and about 3500 psig. Optionally, the hydrotreating step is performed at a temperature between about 150° C. and about 350° C., and a pressure between about 800 psig and about 1500 psig.

In certain embodiments, the contacting of step (b) in the presence of a hydrotreating catalyst may be performed in two steps, the first performed at a temperature of between about 120° C. and 200° C., followed by a higher temperature of between about 200° C. and about 450° C.

In some embodiments, the pyrolysis oil may be contacted with the feed in the presence of a catalyst, wherein the catalyst is selected from the group consisting of: alumina, hafnia, titania, and zirconia, and mixtures thereof. In certain embodiments the catalyst may be a solid catalyst selected from the group consisting of alumina, silica-alumina, hafnia, titania, zirconia and mixtures thereof.

Alternatively, the pyrolysis oil may be contacted with the feed in the absence of a catalyst. Alcohol species useful as feed for the processes described herein may include one or more C1-C30 alcohols, such as methanol, ethanol, butanol, tetrahydrofurfuryl alcohol, ethylene glycol, propylene glycol, glycerol, fatty alcohols, and mixtures thereof. In certain embodiments, the mass ratio of the pyrolysis oil to the one or more alcohol species is 0.05 to 10. In certain embodiments, the feed for the process may be formed from biomass through fermentation.

The process may optionally include a separation step wherein the solid residue is separated out from the product mixture using a separator, the separation step being performed by filtration, extraction, decantation, centrifugation and any combination thereof, and where the separator is selected from the group consisting of a gas-liquid, liquid-liquid, three-phase, horizontal, vertical, tubular, rotary, turbine, centrifugal and any combination thereof.

The process may optionally further comprise a step for recovering the un-reacted quantity of the feed from the product mixture of step (a), and recycling as at least a portion of the feed of step (a).

The contacting, or hydrotreating, of step (b) may optionally be performed in the presence of a high boiling point hydrocarbon solvent in addition to said hydrogen, to produce one or more fuel range hydrocarbon products and excess hydrocarbon solvent. In certain embodiments, the high boiling point hydrocarbon solvent is selected from the group consisting of diesel oil, atmospheric gas oil, vacuum gas oil, cracked stock gas oils such as light cycle oil, heavy cycle oil, fluid catalytic cracking decant oil, coker gas oil, thermal cracking distillate, visbreaking distillate, other refinery stream comprising predominantly C11-C25 hydrocarbons and any mixtures thereof.

In certain embodiments, the excess hydrocarbon solvent is separated from the one or more fuel range hydrocarbons product and recycled as at least a portion of the high boiling point hydrocarbon solvent used in step (b).

The processes described herein provide novel methods to prepare hydrocarbon products via alcoholysis of a pyrolysis oil, followed by hydrotreating. The hydrocarbon products are 100% fungible with conventional transportation fuels.

BRIEF DESCRIPTION OF THE DRAWINGS

A more complete understanding of the present invention and benefit thereof may be acquired by referring to the following description taken in conjunction with the accompanying drawings in which:

FIG. 1 is a schematic representation of one embodiment of the current inventive process, demonstrating the steps involved in pyrolysis oil alcoholysis with subsequent hydrotreating to hydrocarbons.

DETAILED DESCRIPTION

The present invention relates to a process for converting pyrolysis oil obtained by pyrolysis of biomass into fuel range hydrocarbons by alcoholysis of pyrolysis oil with subsequent hydrotreatment.

The pyrolysis oils used in the process of the current invention may be derived from any type of biomass, including agricultural residues, city waste, and aquatic biomass. Pyrolysis is the chemical decomposition of biomass by heating in the absence of oxygen or other reagents. U.S. Pat. No. 4,891,459, the contents of which are herein incorporated by reference in their entirety, describes one basic exemplary approach for the pyrolysis of biomass.

According to certain embodiments of the process, the bio-oil or pyrolysis oil produced by pyrolysis of biomass can be mixed with one or more alcohol species to perform an alcoholysis reaction and form an alcoholysis product.

Exemplary alcohols used with embodiments described herein include aliphatic, aromatic, and alicyclic alcohols. In some embodiments, exemplary alcohols comprise C1-C30 alcohols (alcohols with one to thirty carbon atoms). In some embodiments, alcohols comprise C1-C6 alkyl alcohols. In some embodiments, alcohols used herein can be mono-functional or multi-functional (e.g., one alcohol moiety or multiple alcohol moieties). Alcohols useful for the embodiments of the current invention include but are not limited to methanol, ethanol, propanol, isopropyl alcohol, butanol, tetrahydrofurfuryl alcohol, ethylene glycol, propylene glycol, glycerol, benzyl alcohol, fatty alcohols, and any mixture thereof. Alcohols used with embodiments herein may also include those formed from biomass through fermentation processes. Therefore, alcohols used with embodiments herein may be derived from industrial processing wastes, food processing wastes, mill wastes, municipal/urban wastes, forestry products and forestry wastes, agricultural products and agricultural wastes, amongst other sources. In some embodiments, alcohols used herein can be formed from biological wastes using processes such as those described in U.S. Pat. No. 7,309,592, the content of which is herein incorporated by reference in its entirety.

In at least one embodiment of the current invention, the mass ratio of pyrolysis oil to alcohol is 0.05 to 10. In another embodiment of the current invention, the mass ratio of the pyrolysis oil to alcohol is 0.25 to 1. In yet another embodiment of the current invention, the mass ration of the pyrolysis oil to alcohol is 0.25 to 0.5.

In at least one embodiment, the alcoholysis reaction of pyrolysis oil is carried out in the absence of a catalyst. According to another embodiment of the invention, the alcoholysis reaction of pyrolysis oil is carried out in the presence of a catalyst such as but not limited to a solid catalyst. In one embodiment, the catalyst is selected from the group consisting of alumina, silica-alumina, hafnia, titania, and zirconia, and mixtures thereof.

In an embodiment of the current inventive process, the pyrolysis oil is reacted with the feed comprising one or more alcohol species at a temperature between 150° C. and 500° C., and a pressure of between 500 psig and 4000 psig. In another embodiment of the current inventive process, the pyrolysis oil is reacted with the alcohol or a mixture of alcohols at a temperature between 250° C. and 500° C.; a pressure of between 1500 psig and 4000 psig.

In certain embodiments, the high temperature and pressure conditions utilized allow destruction of high molecular weight species found in the pyrolysis oil. These high molecular weight species found in pyrolysis oil are main precursors to coke/char formation, and often limit upgradability of pyrolysis oil.

Additionally, alcoholysis lowers the concentration of pyrolysis oil carboxylic acids by forming their respective esters. This way, alcoholysis reduced the acidity of the pyrolysis oil, thereby improving the product storage stability, among other benefits. Alcohols also react with reactive pyrolysis compounds, which lowers their reactivity. For instance, reactive species such as furfurals, sugars, and aldehydes in general, easily react with alcohols forming ketals and other compounds. Aldehydes and related compounds are prone to polymerization and coking reactions. Lowering the concentration of these compounds and eliminating their reactivity improves the thermal stability of the resulting products, thereby increasing upgradability.

The pyrolysis oil may be reacted with the alcohol or a mixture of alcohols for a length of time sufficient for the alcoholysis reaction to reach a desired level of completion. This will, in turn, depend on various factors including the temperature of the reaction, the chemical nature of the catalyst, and the surface area of the catalyst, the contact time with the catalyst and the like.

In an embodiment, the duration of the reacting is between about 2 minutes and 240 minutes. In another embodiment, the duration of the reacting is between about 15 minutes and 120 minutes. In yet another embodiment, the duration of the reacting is between about 30 minutes and 60 minutes.

The alcoholysis of pyrolysis oil process according to the current invention may be carried out in any reactor types, including simple pipe reactors.

According to the embodiments described herein, the alcoholysis reaction of a pyrolysis oil with an alcohol or a feed comprising a mixture of alcohols may produce a product mixture comprising an alcoholysis product, solid residue, and excess alcohol or a mixture of alcohols.

Solid residue after the alcoholysis reaction may be separated out from the alcoholysis product via any separation method with any type of separator. Exemplary separation processes applicable to the embodiment of the invention can include filtration, extraction, decantation, centrifugation or any combinations thereof. Separators may be combined to achieve better separation of mixed solutions, including separators to remove one or more components at each separation.

According to the embodiment of the invention, the excess alcohol or a mixture of alcohols from the alcoholysis product may be recovered and recycled for use as the alcohol feed for alcoholysis of pyrolysis oil. In one embodiment, the recovering step is carried out using distillation method.

As presented here, alcoholysis of pyrolysis oil produces an alcoholysis product that can be upgraded under hydrotreating conditions. Hydrotreating of the alcoholysis product permits removal of oxygen and other heteroatoms yielding a hydrocarbon product. In one embodiment, hydrotreating is carried out with conventional refinery technology and conventional hydrotreating catalysts. In some embodiment, in addition to the presence of hydrogen, the hydrotreating process is conducted along with the presence of a high boiling point hydrocarbon solvent, such as diesel oil, atmospheric gas oil, vacuum gas oil, cracked stock gas oils such as, but not limited to, light cycle oil, heavy cycle oil, fluid catalytic cracking decant oil, coker gas oil, thermal cracking distillate, visbreaking distillate, other refinery stream comprising predominantly C11-C25 hydrocarbons and any mixtures thereof. The hydrocarbon solvent allows a smoother hydrotreating process, decreasing coke formation, and precluding premature catalyst deactivation.

In certain embodiments of the current inventive process, the hydrotreating of the alcoholysis product is carried out at a temperature between 120° C. and 450° C., and a pressure of between 500 and 3500 psig. In other embodiments of the current inventive process, the hydrotreating of the alcoholysis product is carried out at a temperature between 150° C. and 350° C., and a pressure of between 800 and 1500 psig.

According to one embodiment of the invention, the hydrotreating process of the alcoholysis product is carried out in the presence of a catalyst such as but not limited to cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), nickel, copper impregnated zinc oxide (Cu/ZnO), copper impregnated chromium oxide (Cu/Cr), nickel aluminum oxide (Ni/$Al_2O_3$), palladium aluminum oxide (Pd/$Al_2O_3$), cobalt molybdenum (CoMo), nickel molybdenum (NiMo), nickel molybdenum tungsten (NiMoW), sulfided cobalt molybdenum (CoMo), sulfided nickel molybdenum (NiMo), metal carbides, or any combinations thereof.

Hydrotreating may be accomplished in one reaction step, or optionally, two steps. In a two-step process, the alcoholysis mixture may be hydrogenated first at a lower temperature, such as about 120° C. to about 200° C., followed by a hydrogenation step at a higher temperature of about 200° C. to about 450° C. The alcohol solvent may be separated following the first hydrogenation step and recycled for use in the alcoholysis step.

After hydrotreating, product separation may be conducted via distillation or any other known method. Distillation allows the recycling of the hydrocarbon solvent, used for some embodiment, and provides a clean biofuel product made of hydrocarbons fungible with conventional transportation fuels.

Light hydrocarbon products (not shown), as formed from residual alcohol and low molecular weight compounds can be sent to a reformer for hydrogen production. Hydrogen produced this way is recycled to the hydrotreating step.

FIG. 1 is a schematic diagram of a process in accordance with one embodiment of the invention. In this embodiment, a pyrolysis oil 40, an alcohol 20, and water 60 are fed to a reactor 100 wherein the alcoholysis reaction is carried out and an alcoholysis product is formed. In certain embodiments, the alcoholysis of pyrolysis oil process may be carried out in any reactor type or configuration, including simple pipe reactors.

In one embodiment of the current inventive process, the pyrolysis oil is reacted with the alcohol or a mixture of alcohols at a temperature between 150° C. and 500° C., and a pressure of between 500 and 4000 psig. In another embodiment of the current inventive process, the pyrolysis oil is reacted with the alcohol or a mixture of alcohols at a temperature between 250 and 500° C.; a pressure of between 1500 and 4000 psig.

The pyrolysis oil may be reacted with the alcohol or a mixture of alcohols for a length of time sufficient for the alcoholysis reaction to reach a desired level of completion. In an embodiment, the contact time is between about 2 minutes and 240 minutes. In another embodiment, the contact time is between about 15 minutes and 120 minutes. In yet another embodiment, the contact time is between about 30 minutes and 60 minutes.

Alcohols used with embodiments herein can include aliphatic, aromatic, and alicyclic alcohols. In some embodiments, alcohols can include C1-C30 alcohols. In some embodiments, alcohols can include C1-C6 alkyl alcohols. In some embodiments, alcohols used herein can be mono-functional or multi-functional (e.g., one alcohol moiety or multiple alcohol moieties). Alcohols useful for the current invention include, but are not limited to: methanol, ethanol, propanol, isopropyl alcohol, butanol, tetrahydrofurfuryl alcohol, ethylene glycol, propylene glycol, glycerol, benzyl alcohol, fatty alcohols, and mixtures thereof. Alcohols used with embodiments herein may also include those formed from biomass through fermentation processes. Therefore, alcohol used for the processes described herein may be derived from industrial processing wastes, food processing wastes, mill wastes, municipal/urban wastes, forestry products and forestry wastes, agricultural products and agricultural wastes, amongst other sources.

According to one embodiment of the current invention, the mass ratio of pyrolysis oil to alcohol which was fed into reactor 100 is 0.05 to 10. In another embodiment, the mass ratio of the pyrolysis oil to alcohol is 0.25 to 1. In yet another embodiment, the mass ratio of the pyrolysis oil to alcohol is 0.25 to 0.5.

In the embodiment depicted in FIG. 1, the alcoholysis reaction of pyrolysis oil is carried out in the absence of a catalyst. According to another embodiment of the invention (not shown in FIG. 1), the alcoholysis reaction of pyrolysis oil is carried out in the presence of a catalyst, such as, but not limited to, a solid catalyst. The catalyst may be selected from the group consisting of alumina, hafnia, titania, and zirconia and mixtures thereof.

Referring to FIG. 1 again, a mixture 200 of solid residue, excess alcohol along with alcoholysis product is also obtained in reactor 100. The mixture 200 of alcoholysis product, solid residue, and excess alcohol is then passed through a solids separation device 110, where the solid residue is separated out from the mixture 200. In some embodiments of the invention, the separator may be selected from the group consisting of: a gas-liquid, liquid-liquid, three-phase, horizontal, vertical, tubular, rotary, turbine, centrifugal, and any combinations thereof. In some embodiments, this separation step may carried out by filtration, extraction, decantation, centrifugation or any combinations thereof.

The solid, residue-free effluent 210 may further pass through an alcohol recovery device 120 where any excess alcohol 220 is separated out from the alcoholysis product and recycled back for use as alcohol feed for the alcoholysis reaction. In one embodiment, this alcohol recovery step is carried out by distillation.

Further referring to FIG. 1, the alcoholysis product 230, now free of solid residue and excess alcohol, may pass through an upgrader 130 wherein the alcoholysis product is contacted with a hydrotreating catalyst (not shown) in the presence of hydrogen under reaction conditions sufficient for converting at least a portion of the alcoholysis product into one or more fuel range hydrocarbon products. Such reactions may be carried out with conventional refinery hydrotreating technology and conventional hydrotreating catalysts. In some embodiments, in addition to the presence of hydrogen, the hydrotreating process is conducted along with the presence of a high boiling point hydrocarbon solvent, such as diesel oil, light cycle oil, or other refinery stream. The hydrocarbon solvent allows a smoother hydrotreating process, decreasing coke formation, and preventing premature catalyst deactivation.

In an embodiment, the hydrotreating of the alcoholysis product 230 may be carried out at a temperature between 120° C. and 450° C., and a pressure of between 500 and 3500 psig. In another embodiment, the hydrotreating of the alcoholysis product may be carried out at a temperature between 150° C. and 350° C., and a pressure of between 800 and 1500 psig.

According to one embodiment of the invention, the hydrotreating process of the alcoholysis product 230 is carried out in the presence of a catalyst such as, but not limited to: cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), nickel, copper impregnated zinc oxide (Cu/ZnO), copper impregnated chromium oxide (Cu/Cr), nickel aluminum oxide (Ni/Al$_2$O$_3$), palladium aluminum oxide (Pd/Al$_2$O$_3$), cobalt molybdenum (CoMo), nickel molybdenum (NiMo), sulfided cobalt molybdenum (CoMo), sulfided nickel molybdenum (NiMo), metal carbides, or any combinations thereof.

Further referring to FIG. 1, the hydrotreating effluent 240 comprising one or more fuel range hydrocarbon products may pass through one or more separation devices 140, where hydrogen 250 and low molecular weight hydrocarbons (not depicted) are separated out. Low molecular weight hydrocarbons formed from residual alcohol (not shown) and the low molecular weight compounds from the hydrotreating effluent 240 can be sent to a reformer (not depicted) for producing additional hydrogen 250 that can be recycled to the upgrader 130 for use in the hydrotreating reaction.

In the embodiment as shown in FIG. 1, the effluent 260 further passes through a separator device 150 where the excess hydrocarbon solvent 270 is separated out and recycled back to the upgrader 130. The useful separator for this embodiment may be a distillation column. Distillation allows the recycling of the hydrocarbon solvent 270 and provides a clean fuel range hydrocarbon product 280 comprising hydrocarbons fungible with conventional transportation fuels.

The current disclosure provides straightforward methodology to prepare upgradeable pyrolysis oil via alcoholysis. The water in pyrolysis oil promotes hydrolysis and cracking of different pyrolysis oil components. Direct alcoholysis of pyrolysis oil results in lower concentration of acidic species (lower total acid number, or TAN), thereby increasing the pH of the oil. Importantly, alcoholysis of pyrolysis oil significantly reduces the molecular weight average of pyrolysis oil components. The latter is key for upgradability, as heavy molecular weight species in pyrolysis oil promote char formation and coke deposition during catalytic upgrading to hydrocarbons, seriously hindering upgrading viability. The invention uses well-established hydrotreating technology for oxygen removal and hydrocarbon production. The biofuel products produced by the methods disclosed herein are 100% fungible with conventional transportation fuels.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise. It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents. Each and every claim below is hereby incorporated into this detailed description or specification as an additional embodiments of the present invention.

REFERENCES

All of the references cited herein are expressly incorporated by reference. The publications and patents disclosed herein are provided solely for their disclosure. The discussion of any reference is not an admission that it is prior art to the present invention, especially any reference that may have a publication data after the priority date of this application. Incorporated references are listed again here for convenience:
1. U.S. Pat. No. 4,891,459 *"OIL PRODUCTION BY ENTRAINED PYROLYSIS OF BIOMASS AND PROCESSING OF OIL AND CHAR"*, Knight, et al., Georgia Tech Research Corporation.
2. U.S. Pat. No. 7,309,592 *"ETHANOL PRODUCTION FROM BIOLOGICAL WASTES"*, Offerman, et al., Novus Energy, LLC.
3. W. Baldauf, et al., 7th European Conference on Biomass for Energy and Environment, Agriculture and Industry.

That which is claimed:

1. A process for converting pyrolysis oil to a hydrocarbon fuel, comprising:
    a) reacting a pyrolysis oil with a feed comprising one or more alcohol species in a reactor to form a product mixture comprising an alcoholysis product;
    b) contacting the alcoholysis product with a hydrotreating catalyst in the presence of hydrogen in a reaction zone under reaction conditions sufficient to convert at least a portion of said alcoholysis product into one or more fuel range hydrocarbon products.

2. The process of claim 1, wherein the product mixture of step (a) additionally comprises solid residue, and an un-reacted quantity of the one or more alcohol species.

3. The process of claim 1, further comprising a step prior to step (a) for pyrolyzing a biomass to form the pyrolysis oil of step (a).

4. The process of claim 1, wherein the reacting of step (a) is performed at a temperature between about 150° C. and about 500° C.; a pressure between about 500 psig and about 4000 psig; and for a duration of between 2 min and 240 minutes.

5. The process of claim 1, wherein the reacting of step (a) is performed at a temperature between 250° C. and about 500° C.; a pressure of between 1500 psig and about 4000 psig; and for a duration of between 15 min and 120 min.

6. The process of claim 1, wherein the reaction conditions of step (b) comprise a temperature of between about 120° C. and about 450° C., and a pressure of between about 500 psig and about 3500 psig.

7. The process of claim 1, wherein the reaction conditions of step (b) comprise a temperature of between about 150° C. and about 350° C., and a pressure of between about 800 psig and about 1500 psig.

8. The process of claim 1, wherein the contacting of step (b) is first performed at a temperature of between about 120° C. and 200° C., followed by contacting at a higher temperature of between about 200° C. and about 450° C.

9. The process of claim 2, further comprising a separation step wherein the solid residue is separated out from the product mixture using a separator, the separation step being performed by filtration, extraction, decantation, centrifugation and any combination thereof, and wherein said separator is selected from the group consisting of a gas-liquid, liquid-liquid, three-phase, horizontal, vertical, tubular, rotary, turbine, centrifugal and any combination thereof.

10. The process of claim 2, further comprising a step for recovering the un-reacted quantity of the one or more alcohol species from the product mixture of step (a), and recycling at least a portion of the un-reacted quantity as feed for step (a).

11. The process of claim 1, wherein the reacting of step (a) occurs in the presence of a catalyst, wherein the catalyst is selected from the group consisting of alumina, hafnia, titania, zirconia, and mixtures thereof.

12. The process of claim 1, wherein the reacting of step (a) occurs in the presence of a solid catalyst, wherein the catalyst is selected from the group consisting of alumina, silica-alumina, hafnia, titania, zirconia and mixtures thereof.

13. The process of claim 1, wherein the feed comprises one or more C1-C30 alcohols.

14. The process of claim 1, wherein the feed is selected from the group comprising methanol, ethanol, butanol, tetrahydrofurfuryl alcohol, ethylene glycol, propylene glycol, glycerol, fatty alcohols and mixtures thereof.

15. The process of claim 1, wherein the feed is formed from biomass through fermentation processes.

16. The process of claim 1, wherein the mass ratio of the pyrolysis oil to the feed is 0.05 to 10.

17. The process of claim 1, wherein the hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru), nickel, copper impregnated zinc oxide (Cu/ZnO), copper impregnated chromium oxide (Cu/Cr), nickel aluminum oxide (Ni/$Al_2O_3$), palladium aluminum oxide (Pd/$Al_2O_3$), cobalt molybdenum (CoMo), nickel molybdenum (NiMo), nickel molybdenum tungsten (NiMoW), sulfided cobalt molybdenum (CoMo), sulfided nickel molybdenum (NiMo), metal carbides, or any combinations thereof.

18. The process of claim 1, wherein the contacting of step (b) is performed in the presence of a high boiling point hydrocarbon solvent in addition to said hydrogen, to produce one or more fuel range hydrocarbon products and excess hydrocarbon solvent.

19. The process of claim 18, wherein the high boiling point hydrocarbon solvent is selected from the group consisting of diesel oil, atmospheric gas oil, vacuum gas oil, cracked stock gas oils such as light cycle oil, heavy cycle oil, fluid catalytic cracking decant oil, coker gas oil, thermal cracking distillate, visbreaking distillate, other refinery stream comprising predominantly C11-C25 hydrocarbons and any mixtures thereof.

20. The process of claim 18, wherein the excess hydrocarbon solvent is separated from the one or more fuel range hydrocarbons product and recycled as at least a portion of the high boiling point hydrocarbon solvent used in step (b).

* * * * *